United States Patent
Antony et al.

(10) Patent No.: US 9,164,695 B2
(45) Date of Patent: Oct. 20, 2015

(54) PLACING A STORAGE NETWORK DEVICE INTO A MAINTENANCE MODE IN A VIRTUALIZED COMPUTING ENVIRONMENT

(71) Applicant: VMWARE, INC., Palo Alto, CA (US)

(72) Inventors: Jinto Antony, Bangalore (IN); Sudhish Panamthanath Thankappan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/156,480

(22) Filed: Jan. 16, 2014

(65) Prior Publication Data

US 2015/0153964 A1 Jun. 4, 2015

(30) Foreign Application Priority Data

Dec. 3, 2013 (IN) ............................ 5584/CHE/2013

(51) Int. Cl.
| | |
|---|---|
| G06F 13/38 | (2006.01) |
| G06F 13/00 | (2006.01) |
| G06F 3/06 | (2006.01) |
| G06F 9/455 | (2006.01) |

(52) U.S. Cl.
CPC .............. *G06F 3/0655* (2013.01); *G06F 3/061* (2013.01); *G06F 3/0683* (2013.01); *G06F 9/45533* (2013.01)

(58) Field of Classification Search
None
See application file for complete search history.

(56) References Cited

U.S. PATENT DOCUMENTS

| | | | | |
|---|---|---|---|---|
| 7,774,391 | B1 * | 8/2010 | Le et al. ........................ | 707/822 |
| 8,175,863 | B1 * | 5/2012 | Ostermeyer et al. ............ | 703/22 |
| 8,667,490 | B1 * | 3/2014 | van der Goot .................... | 718/1 |
| 2009/0089781 | A1 * | 4/2009 | Shingai et al. .................... | 718/1 |
| 2009/0259816 | A1 * | 10/2009 | Sharma et al. ................ | 711/162 |
| 2010/0161922 | A1 * | 6/2010 | Sharp et al. .................... | 711/162 |
| 2011/0022812 | A1 * | 1/2011 | van der Linden et al. ..... | 711/163 |
| 2011/0321041 | A1 * | 12/2011 | Bhat et al. ......................... | 718/1 |
| 2013/0268800 | A1 * | 10/2013 | Rangaiah ..................... | 714/4.11 |

* cited by examiner

*Primary Examiner* — Michael Sun

(57) ABSTRACT

Techniques for placing a first storage network device into maintenance mode in a virtualized computing environment in which each data store is connected to at least one host computing system via a storage network device are described. In one embodiment, a first data store having an active input/output (I/O) path to a first host computing system via the first storage network device is identified. Further, migration of virtual machine disks (VMDKs) on the first data store and/or migration of workloads running on the first host computing system are recommended such that the VMDKs can be accessed by the workloads via any other storage network device.

23 Claims, 11 Drawing Sheets

PLACING A STORAGE NETWORK DEVICE INTO A MAINTENANCE MODE IN A VIRTUALIZED COMPUTING ENVIRONMENT

TECHNICAL FIELD

The present disclosure relates to methods, techniques, and systems for network resource management in a virtualized computing environment and, more particularly, to methods, techniques, and systems for placing a storage network device into a maintenance mode for service/repair, replacement, hardware upgrade and/or software upgrade.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "host computing systems"). A group of hardware computing platforms may be organized as a cluster to provide hardware resources for VMs. VMs may use virtual machine disks (VMDKs) to store its operating system, program files, and other data associated with its activities. The VMDKs that the VMs can access may reside on a data store connected to host computing systems via storage network devices such as fibre channel (FC) switches, Ethernet switches, FC over Ethernet (FCoE) switches and the like. In a data center it is common to see multiple storage network devices and multiple VMs running on multiple clusters of hosts, with each host connected to at least one data store via at least one storage network device.

DETAILED DESCRIPTION

Figure 1:
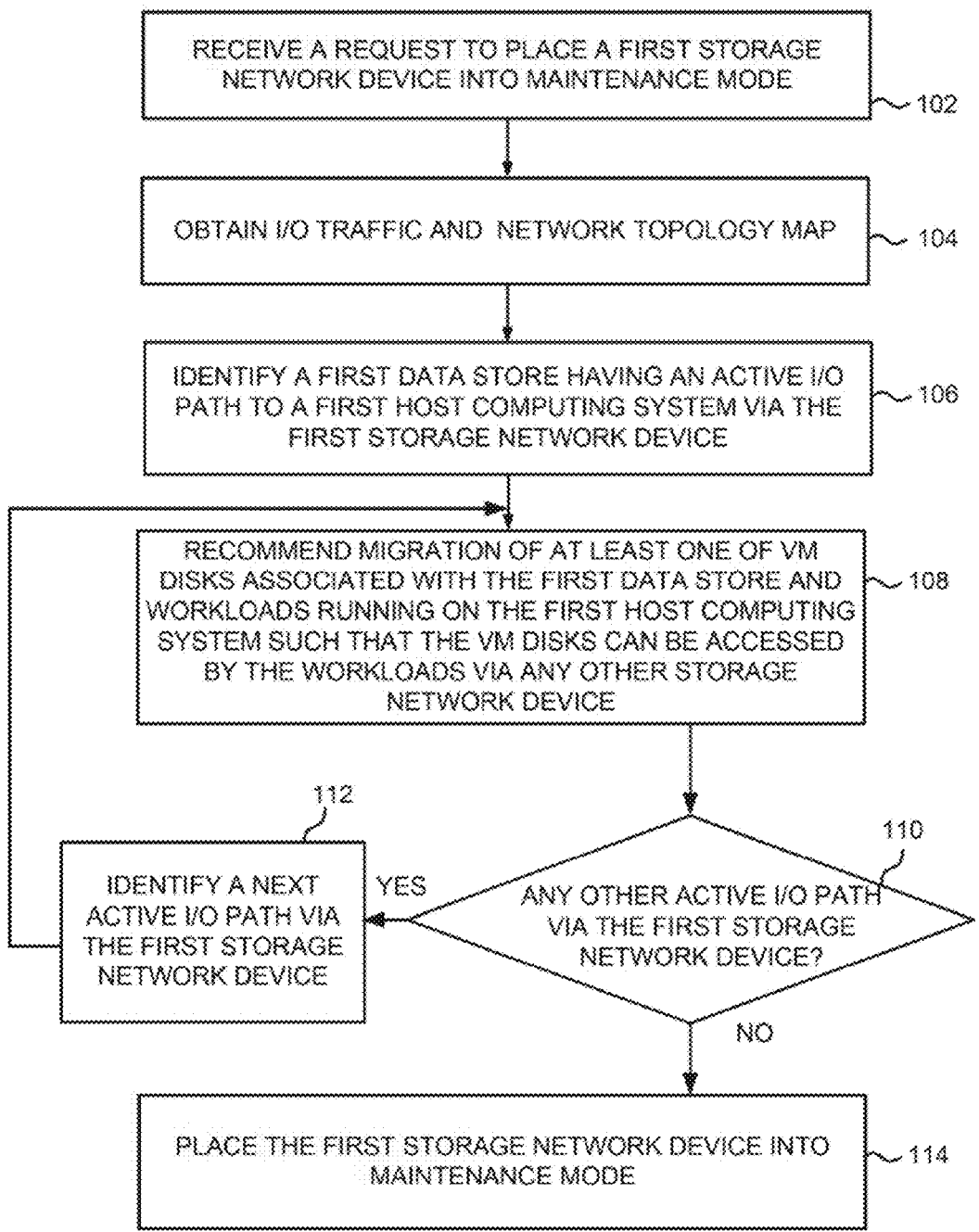
FIG. 1 is a flow chart of a method for placing a first storage network device into a maintenance mode in a virtualized computing environment, according to an example embodiment.

Embodiments described herein provide enhanced computer-based and network-based methods, techniques, and systems for placing a storage network device into a maintenance mode in a virtualized computing environment. The term "virtualized computing environment" is used herein to refer to a physical infrastructure that hosts a virtual infrastructure comprising virtual objects such as virtual machines (VMs), virtual data centers (VDCs), and virtual appliances (vApps). The storage network device can be a fibre channel (FC) switch, an Ethernet switch, an FC over Ethernet (FCoE) switch and so on. Further, the term "maintenance mode" refers to disabling or temporarily inactivating (i.e., placing in standby) active input/output (I/O) paths passing through a storage network device that needs to be taken out of service. For example, a storage network device needs to be placed into a maintenance mode for replacement, service/repair, hardware upgrade and/or software upgrade. Furthermore, the term "exiting maintenance mode" of a storage network device refers to enabling, the I/O paths via the storage network device.

Typically in a virtualized computing environment where each data store is connected to at least one host computing system via a storage network device, a system administrator needs to ensure that a first storage network device is not carrying any I/O traffic for placing the first storage network device into a maintenance mode. To achieve this, the system administrator may need to shutdown workloads (e.g., VMs), host computing systems, and data stores or manually move around the network connections associated with the first storage network device.

The present technique provides a switch maintenance module that identifies a first data store having an active I/O path to a first host computing system via the first storage network device and disables or temporarily inactivates the active path by migrating virtual machine disks (VMDKs) associated with the first data store author workloads running on the first host computing system such that the VMDKs can be accessed by the workloads via the other storage network device. This can be achieved using a network topology map and I/O traffic at the other storage network device. The term "active I/O path" refers to a path that is carrying I/O traffic between a data store and a host computing system in the virtualized computing environment. The term "network topology map" refers to a map showing the relationships/connections between the storage network devices, data stores and host computing systems in the virtualized computing environment. For example, the network topology map is used to determine the interconnections between the storage network devices, data stores and the host computing systems.

In one example implementation, if the first host computing system is not coupled to any other storage network device and the first data store is coupled to a second storage network device, then the workloads running on the first host computing system are migrated to other host computing system coupled to the second storage network device such that the VMDKs can be accessed by the workloads via the second storage network device. It the first data store is not coupled to any other storage network device and the first host computing system is coupled to a third storage network device, then the VMDKs on the first data store are migrated to at least one other data store coupled to the third storage network device such that the VMDKs can be accessed by the workloads via the third storage network device.

If the first host computing system and the first data store are not coupled to any other storage network device, then both the workloads and the VMDKs are migrated simultaneously such that the VMDKs can be accessed by the workloads via any other storage network device. If the first host computing system and the first data store are coupled to two different storage network devices, then either the VMDKs or the workloads are migrated such that the VMDKs can be accessed by the workloads via one of the two storage network devices. In this case, the priority may be given to migration of the VMDKs since there may not be any downtime during the migration of the VMDKs.

Further, the switch maintenance module repeats this process for all active I/O paths that are using the first storage network device and then places the first storage network device into the maintenance mode. In this case, a distributed resource scheduling framework and a storage distributed resource scheduling framework can manage selection of storage network devices based on the I/O traffic, selection of host computing systems based on computing resource (e.g., CPU, memory, and the like) availability, and selection of the data stores based on storage space availability and current I/O load for migration of VMDKs and/or workloads.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense and the scope of the present invention is defined by the appended claims.

FIG. 1 is a flow chart 100 of a method for placing a first storage network device into a maintenance mode in a virtualized computing environment, according to an example embodiment. The virtualized computing environment includes host computing systems, data stores and storage network devices. Further, each host computing system has one or more workloads (e.g., VMs) running therein and each host computing system is coupled to at least one data store via a storage network device. The storage network device includes, but not limited to, an FC switch, Ethernet switch, or FCoE switch.

At step 102, a request to place a first storage network device into a maintenance mode is received. As discussed above, the term "maintenance mode" refers to disabling or temporarily inactivating active I/O paths via the storage network device that needs to be taken our of service for replacement, hardware upgrade, and/or software upgrade. At step 104, I/O traffic and a network topology map associated with the storage network devices are obtained. In an example, the I/O traffic and the network topology map associated with the storage network devices are obtained using a monitoring interface. Monitoring interface represents all interfaces, protocols, and other mechanisms for discovering network topology maps and monitoring network statistics, including I/O traffic at each port of a storage network device. Any existing proprietary and non-proprietary techniques can be used for monitoring storage networks, and it is intended that monitoring interface serve as a generic representation of these techniques.

At step 106, a first data store having an active input/output (I/O) path to a first host computing system via the first storage network device is identified. In this case, the first host computing system executes workloads that access data from the first data store via the first storage network device. At step 108, migration of VMDKs associated with the first data store to other data stores and/or migration of workloads running on the first host computing system to other host computing systems is recommended such that the VMDKs can be accessed by the workloads via any other storage network device. In one example, the recommendation is displayed on a display screen. The migration of the VMDKs and/or the workloads is recommended based on the network topology map and I/O traffic at the other storage network devices.

In an example embodiment, if the other data stores are having passive I/O paths to the other host computing systems, then the passive I/O paths need to be activated before migrating the VMDKs and the workloads. Upon migrating the VMDKs and/or workloads, the active I/O path from the first data store to the first host computing system via the first storage network device can be disabled or temporarily inactivated. Further, recommending the migration of VMDKs and/or workloads is explained in more detail in FIG. 2.

At step 110, a check is made to determine whether there is any other active I/O path between the data stores and the host computing systems via the first storage network device. At step 112, a next active I/O path is identified if there is any other active I/O path between the data stores and the host computing systems via the first storage network device. Further, the steps of recommending and determining are repeated for the next active I/O path via the first storage network device. Once all the active I/O paths that are using the first storage network device are disabled or temporarily inactivated, the first storage network device can be placed into the maintenance mode at step 114.

Figure 2:
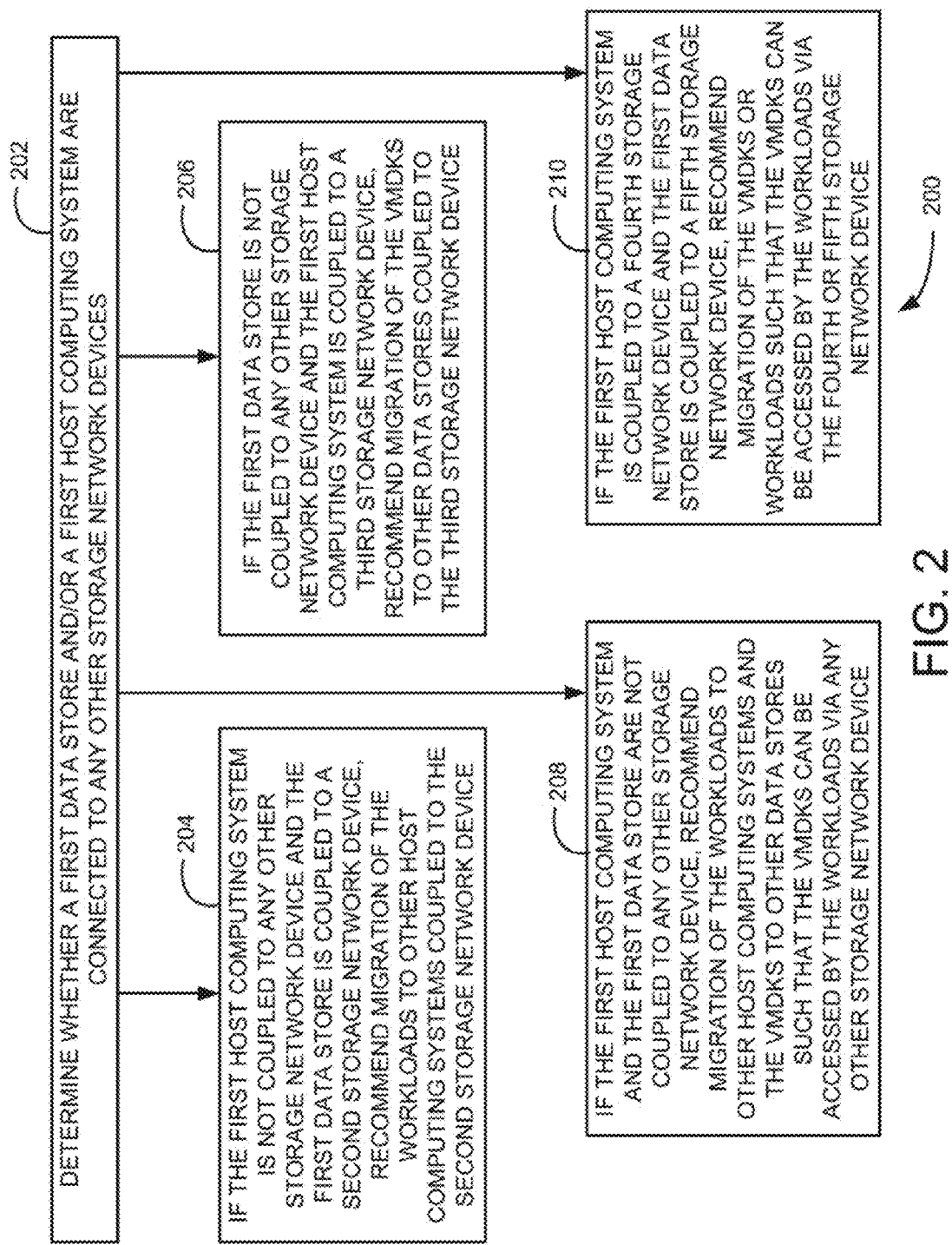
FIG. 2 is a flow chart of a method for recommending migration of virtual machine disks (VMDKs) associated with a first data store and/or workloads running on a first host computing system such that the VMDKs can be accessed by the workloads via any other storage network device, according to an example embodiment.

FIG. 2 is a flow chart 200 of a method for recommending migration of the VMDKs associated with the first data store and/or the workloads running on the first host computing system such that the VMDKs can be accessed by the workloads via any other storage network device, according to an example embodiment. At step 202, it is determined whether the first data store and/or the first host computing system are connected to any other storage network devices using the network topology map. Further, one of the steps 204, 206, 208 and 210 is performed based on the connectivity between first data store and other storage network devices and between the first host computing system and other storage network devices as follows.

At step 204, if the first host computing system is not coupled to any other storage network device and the first data store is coupled to a second storage network device, migration of the workloads running on the first host computing system to other host computing systems coupled to the second storage network device is recommended such that the VMDKs can be accessed by the workloads via the second storage network device. In an example embodiment, if the other host computing systems are having a passive I/O path to the first data store via the second storage network device, then the passive I/O path needs to be activated before migrating the workloads. Step 204 is explained in more detail with reference to FIGS. 3 and 4.

At step 206, if the first data store is not coupled to any other storage network device and the first host computing system is coupled to a third storage network device, migration of the VMDKs on the first data store to other data stores coupled to the third storage network device is recommended such that the VMDKs can be accessed by the workloads via the third storage network device. In an example embodiment, if the other data stores are having a passive I/O path to the first host computing system via the third storage network device, then the passive I/O path needs to be activated before migrating the VMDKs. Step 206 is explained in more detail with reference to FIGS. 5 and 6.

At step 208, if the first host computing system and the first data store are not coupled to any other storage network device, both migration of the workloads running on the first host computing system to other host computing systems and migration of the VMDKs on the first data store to other data stores are recommended such that the VMDKs can be accessed by the workloads via any other storage network device. Step 208 is explained in more detail with reference to FIGS. 7 and 8.

At step 210, if the first host computing system is coupled to a fourth storage network device and the first data store is coupled to a fifth storage network device, migration of the VMDKs or the workloads is recommended such that the VMDKs can be accessed by the workloads via the fourth storage network device or the fifth storage network device. In one embodiment, migration of the VMDKs on the first data store to other data stores coupled to the fourth storage network device is recommended such that the VMDKs can be accessed by the workloads via the fourth storage network device. In another embodiment, migration of the workloads running on the first host computing system to other host computing systems coupled to the fifth storage network device is recommended such that the VMDKs can be accessed by the workloads via the fifth storage network device. In one embodiment, the priority may be given to migration of the VMDKs since there may not be any downtime during the migration of the VMDKs. In another embodiment, the distributed resource scheduling framework and the storage distributed resource scheduling framework can provide cost statistics data associated with the cost of workload migration and VMDK migration to the switch maintenance module. Then the selection can be made based on the cost statistics data provided. Step 210 is explained in more detail with reference to FIG. 9.

Figure 3:
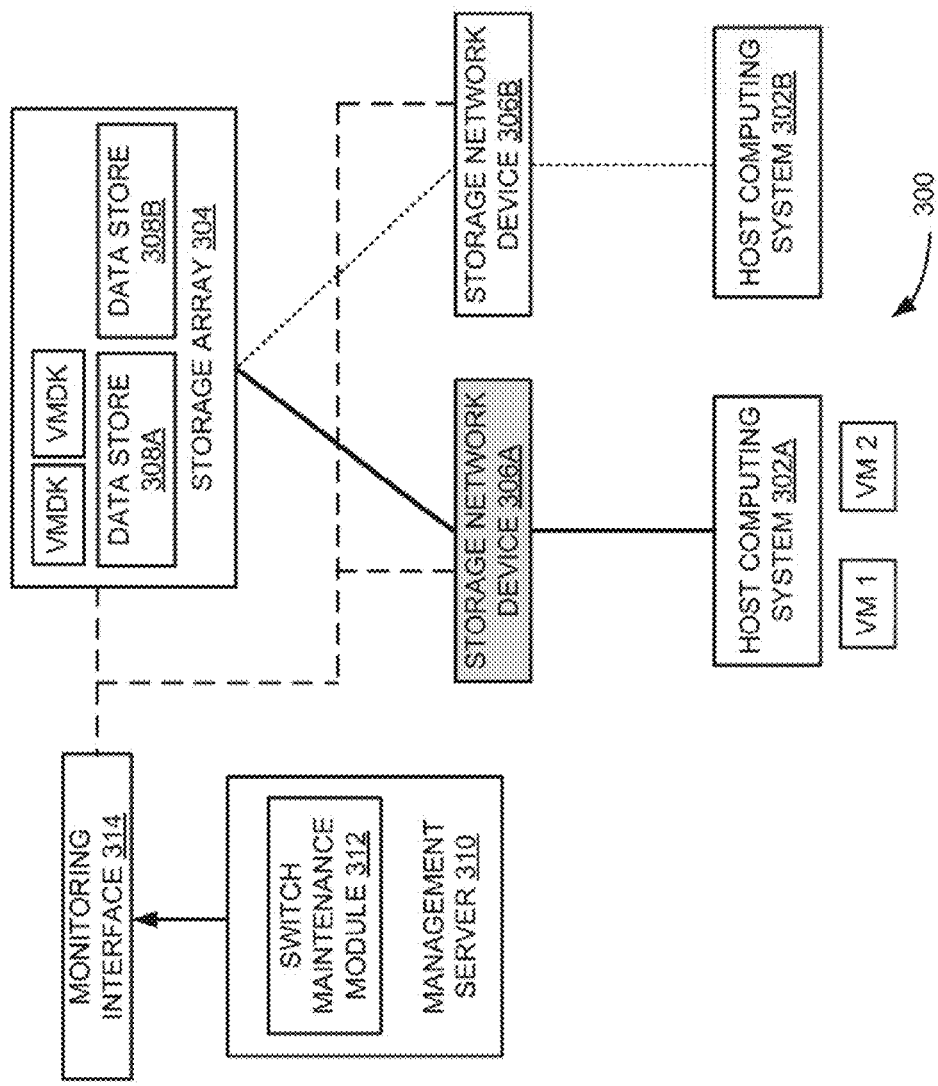
FIG. 3 depicts an active input/output (I/O) path identified between a data store and a host computing system via a storage network device in a virtualized computing environment, according to an example embodiment.

FIG. 3 depicts an active I/O path identified between data store 308A and host computing system 302A via storage network device 306A in a virtualized computing environment 300, according to an example embodiment. In the example shown in FIG. 3, virtualized computing environment 300 includes host computing systems 302A and 302B, storage array 304, management server 310, and monitoring interface 314. Each host computing system 302A and 302B has one or more VMs running therein. Further, storage array 304 includes data stores 308A and 308B. Furthermore, each data store 308A and 308B includes VMDKs to store operating system, program files, and other data associated with VMs.

As shown in FIG. 3, host computing systems 302A and 302B are connected to storage array 304 via storage network devices 306A and 306B, respectively. Storage array 304 may include a storage controller to manage data stores 308A and 308B and presents them to host computing systems 302A and 302B as units. In the example shown in FIG. 3, virtualized computing environment 300 is described using a storage array 304, two host computing systems 302A and 302B and two storage network devices 306A and 306B, however, any number of storage arrays, host computing systems, and storage network devices can be configured in virtualized computing environment 300.

Management server 310 includes switch maintenance module 312. For example, switch maintenance module 312 can be part of virtualization management software (VMS) residing in management server 310. One skilled in the art can appreciate that switch management module 312 can also be provided in a VM or virtual application that can run on any host computing system and can be provided to a user through a graphical user interface as a part of management software.

In operation, switch maintenance module 312 obtains storage or I/O traffic and a network topology map associated with storage network devices 306A and 306B using monitoring interface 314 (e.g., interfaces, protocols, and other mechanisms for discovering network topology maps and monitoring network statistics) as described above in more detail with reference to FIG. 1.

In the example shown in FIG. 3, switch maintenance module 312 initiates a maintenance mode operation of storage network device 306A. Further, switch maintenance module 312 identifies data store 308A as having the active I/O path to host computing system 302A via storage network device 306A using the network topology map. In the example shown in FIG. 3, data store 308A is also connected to storage network device 305B and host computing system 302A is not coupled to any other storage network device. Therefore, switch maintenance module 312 recommends migration of VM 1 and VM 2 running on host computing system 302A to host computing system 302B that is coupled to storage network device 306B. In an example embodiment, if host computing system 302B is having a passive I/O path to data store 308A via storage network device 306B, then the passive I/O path needs to be activated before migrating VM1 and VM2 as shown in FIG. 4.

Figure 4:
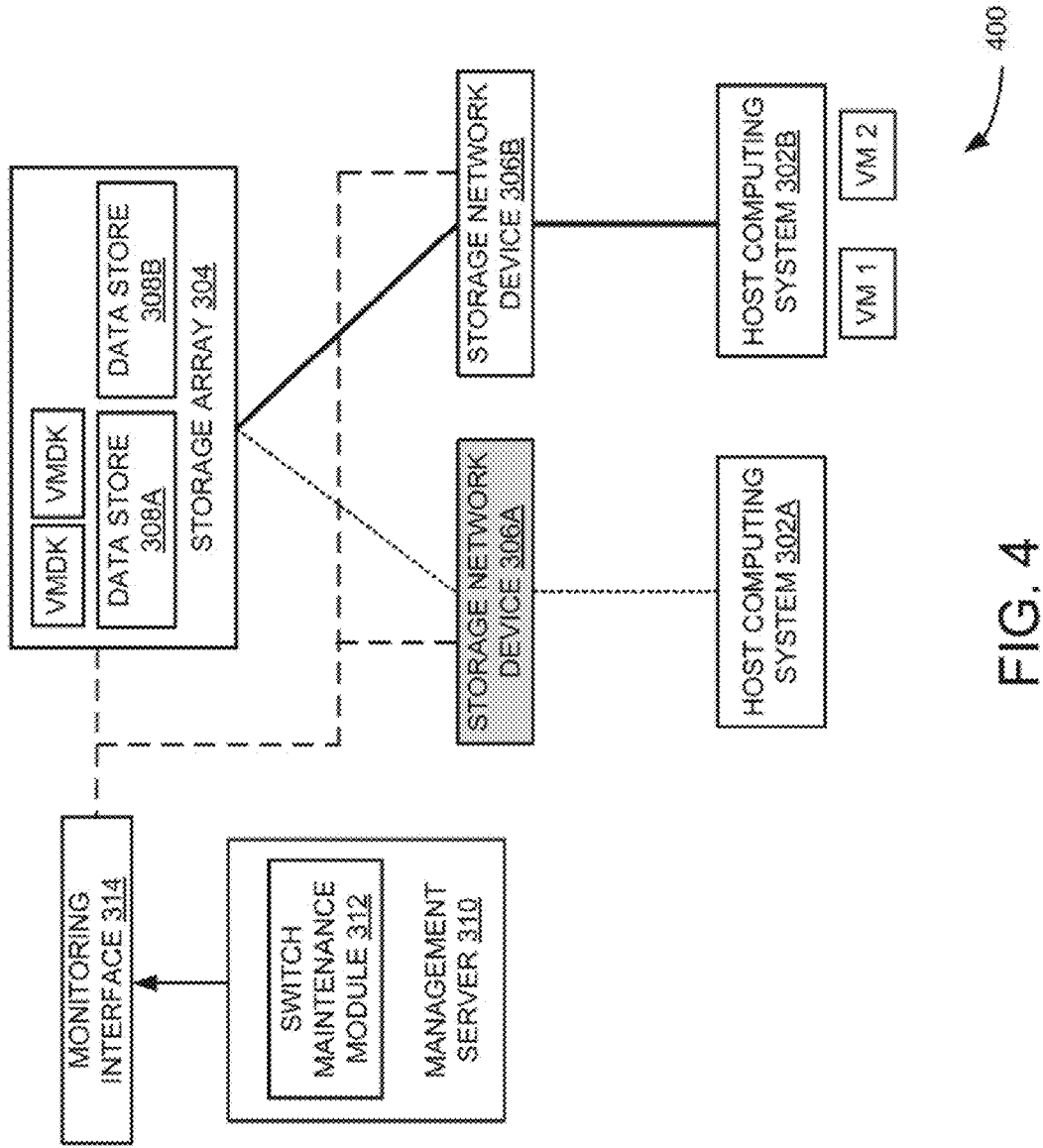
FIG. 4 illustrates placing the storage network device of FIG. 3 into a maintenance mode by migrating workloads running on the host computing system to other host computing system coupled to the data store via other storage network device, according to an example embodiment.

FIG. 4 illustrates placing storage network device 306A into the maintenance mode by migrating VM 1 and VM 2 running on host computing system 302A to host computing system 302B coupled to data store 308A via storage network device 306B, according to an example embodiment. In virtualized computing environment 400 shown in FIG. 4, the passive I/O path between host computing system 302B and computing data store 308A is activated, and then VM 1 and VM 2 are migrated to host computing system 302B. Upon migration, the VMDKs on data store 308A are accessed by VM 1 and VM 2 via storage network device 306B.

Figure 5:
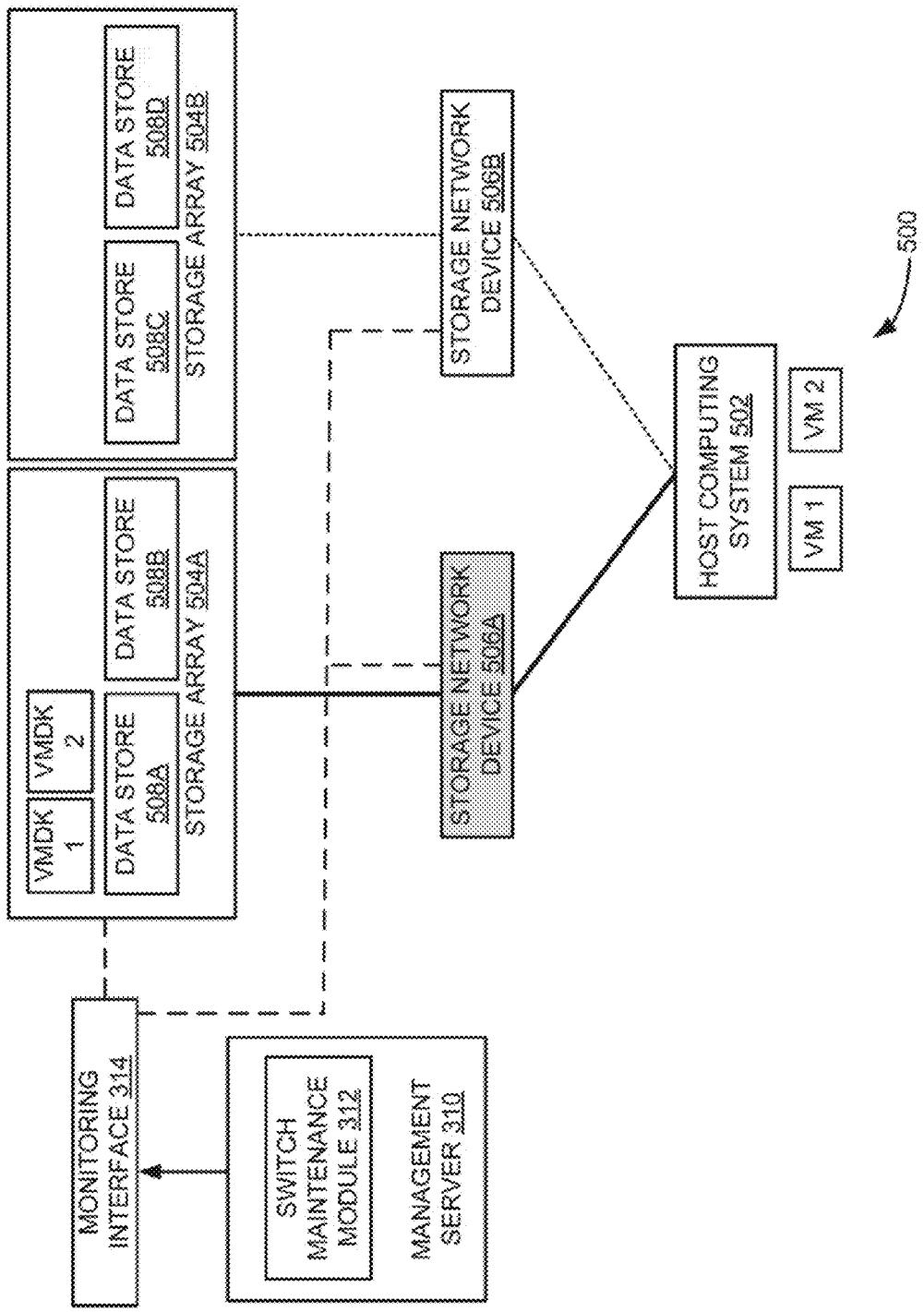
FIG. 5 depicts an active I/O path identified between a data store and a host computing system via a storage network device in a virtualized computing environment, according to an example embodiment.

FIG. 5 depicts an active I/O path identified between data store 508A and host computing system 502 via storage network device 506A in virtualized computing environment 500, according to an example embodiment. In the example shown in FIG. 5, virtualized computing environment 500 includes host computing system 502 and storage arrays 504A and 504B including respective data stores 508A-D. Furthermore, each data store 508A-D includes VMDKs to store operating system, program files, and other data associated with VMs. As shown in FIG. 5, host computing system 502 is connected to storage arrays 504A and 504B via storage network devices 506A and 506B, respectively.

In the example shown in FIG. 5, switch maintenance module 312 initiates a maintenance mode operation of storage network device 506A. Further, switch maintenance module 312 identifies data store 508A as having the active I/O path to host computing system 502 via storage network device 506A using the network topology map. In the example shown in FIG. 5, host computing system 502 is also connected to storage network device 506B and data store 508A is not coupled to any other storage network device. Therefore, switch maintenance module 312 recommends migration of VMDK 1 and VMDK 2 on data store 508A to data store 508C that is coupled to storage network device 506B. In an example embodiment, if host computing system 502 is having a passive I/O path to data store 508C is storage network device 506B, then the passive path needs to be activated before migrating VMDK 1 and VMDK 2 as shown in FIG. 6.

Figure 6:
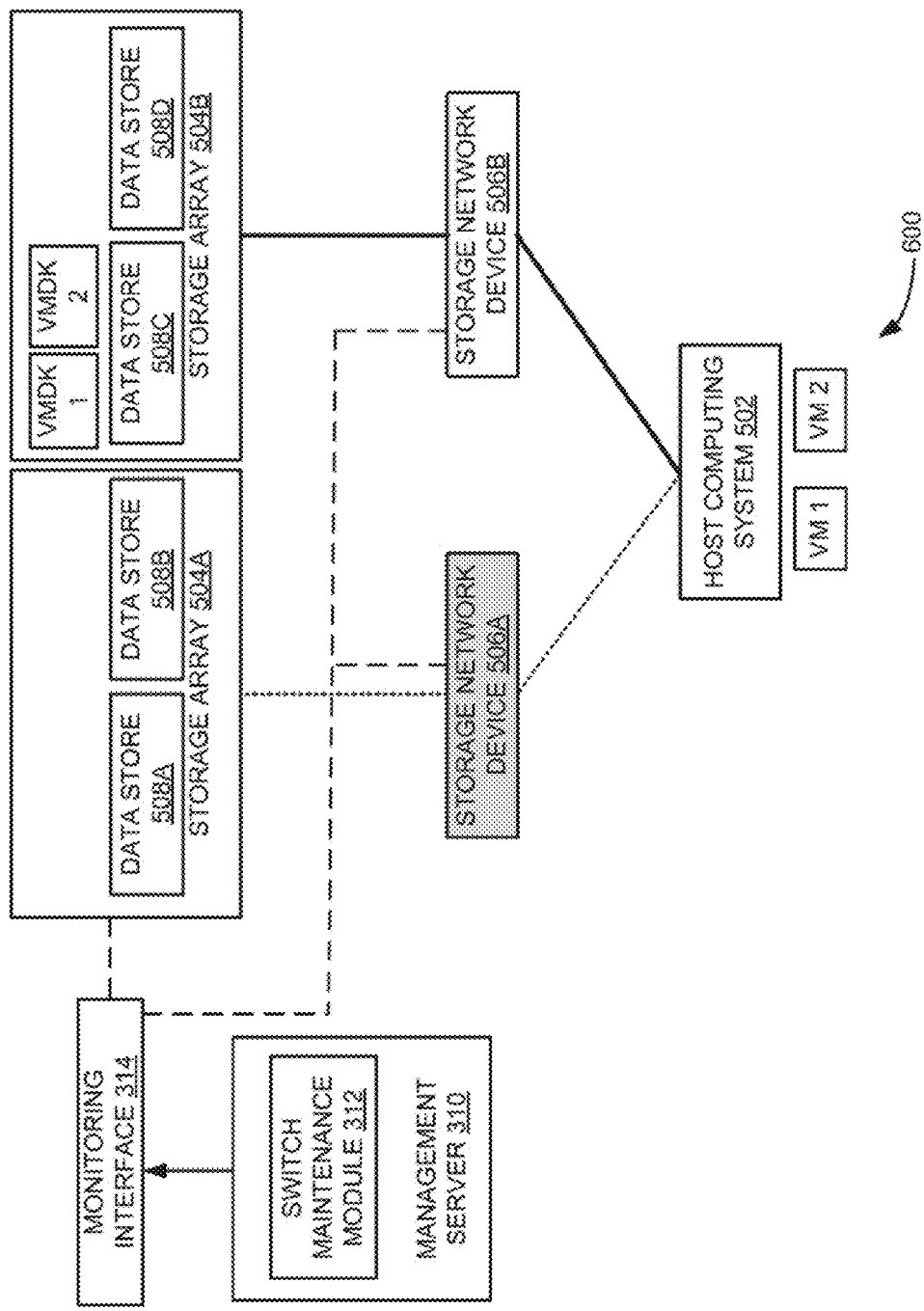
FIG. 6 illustrates placing the storage network device of FIG. 5 into a maintenance mode by migrating VMDKs on the data store to other data store coupled to the host computing system via other storage network device, according to an example embodiment.

FIG. 6 illustrates placing storage network device 506A into the maintenance mode by migrating VMDK 1 and VMDK 2 on data store 508A to data store 508C coupled to host computing system 502 via storage network device 506B, according to an example embodiment. In virtualized computing environment 600 shown in FIG. 6, the passive I/O path between host computing system 502 and data store 508C is activated, and then VMDK 1 and VMDK 2 are migrated to data store 508C. Upon migration, VM 1 and VM 2 access VMDK 1 and VMDK 2 on data store 508C via storage network device 506B.

Figure 7:
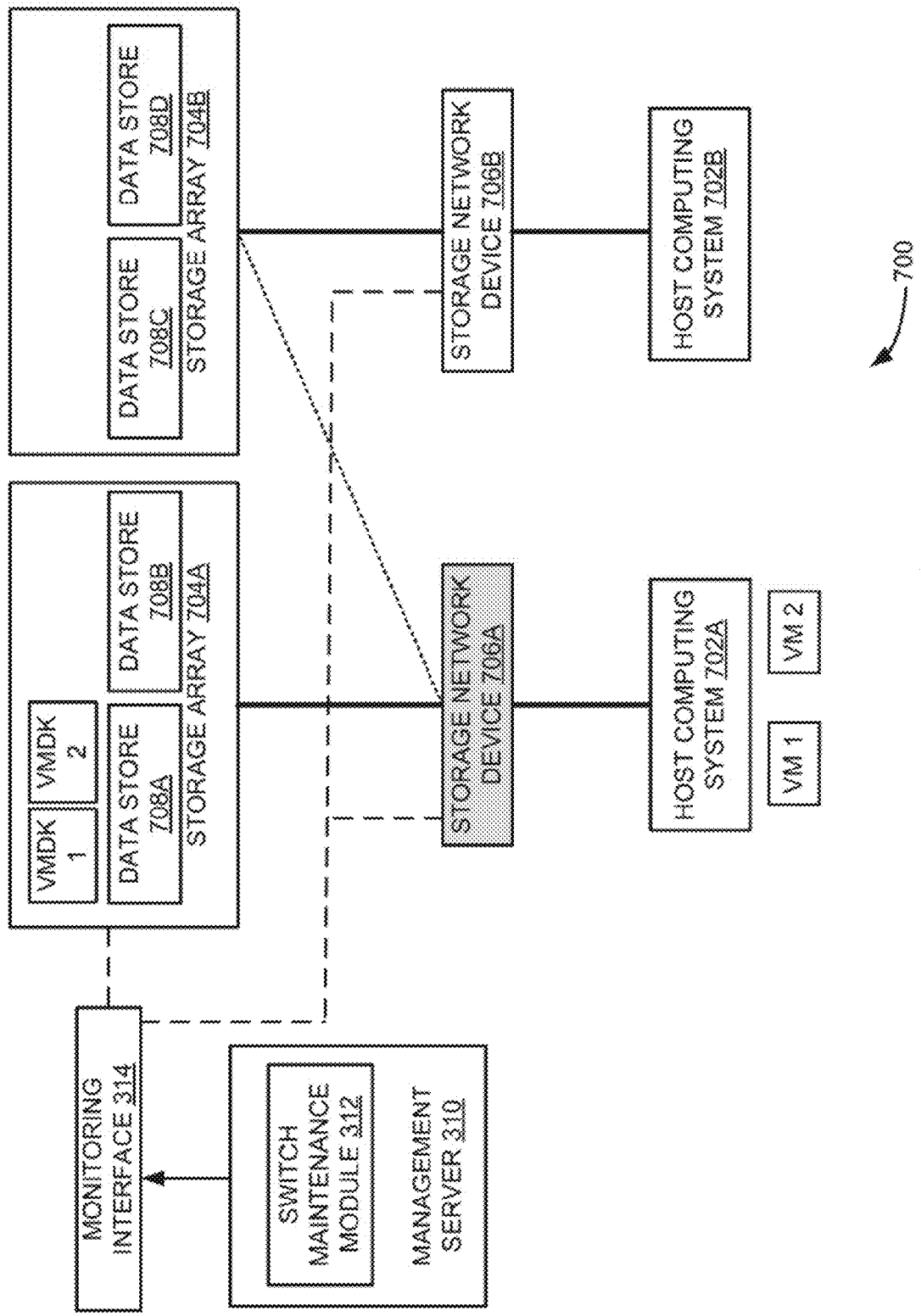
FIG. 7 depicts an active I/O path identified between a data store and a host computing system via a storage network device in a virtualized computing environment, according to an example embodiment.

FIG. 7 depicts an active I/O path identified between data store 708A and host computing system 702A via storage network device 706A in virtualized computing environment 700, according to an example embodiment. In the example shown in FIG. 7, virtualized computing environment 700 includes host computing systems 702A and 702B and storage arrays 704A and 704B including respective data stores 708A-D. Furthermore, each data store 708A-D includes VMDKs to store operating system, program files, and other data associated with VMs. As shown in FIG. 7, host computing system 702A is connected to storage arrays 704A and 704B via storage network device 706A and host computing system 702B is connected to storage array 704B via storage network device 706B.

In the example shown in FIG. 7, switch maintenance module 312 initiates a maintenance mode operation of storage network device 706A. Further, switch maintenance module 312 identifies data store 708A as having the active I/O path to host computing system 702A via storage network device 704A using the network topology map. In the example shown in FIG. 7, both host computing system 702A and data store 708A are not coupled to any other storage network device. Therefore, switch maintenance module 312 recommends migration of VMDK 1 and VMDK 2 on data store 708A to data store 708C and VM 1 and VM 2 running on host computing system 702A to host computing system 702B such that VMDK 1 and VMDK 2 can be accessed by VM 1 and VM 2 via storage network device 704B as shown in FIG. 8.

Figure 8:
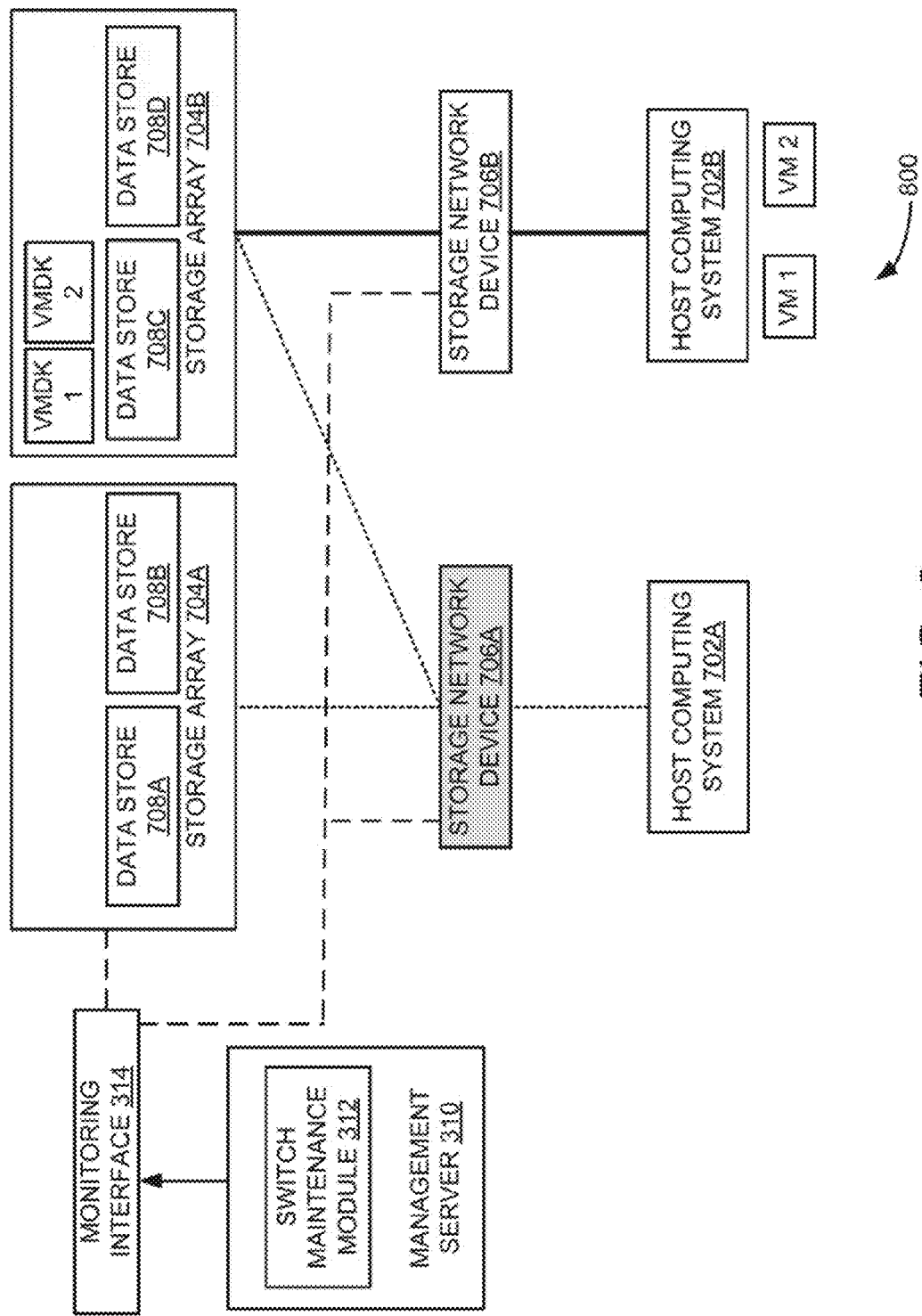
FIG. 8 illustrates placing the storage network device of FIG. 7 into a maintenance mode by migrating workloads running on the host computing system and VMDKs on the data store in parallel such that the VMDKs can be accessed by the workloads via any other storage network device, according to an example embodiment.

FIG. 8 illustrates placing storage network device 706A into a maintenance mode by migrating VM 1 and VM 2 running on host computing system 702A and VMDK 1 and VMDK 2 on data store 708A in parallel such that VMDK 1 and VMDK 2 can be accessed by VM 1 and VM 2 via storage network device 706B, according to an example embodiment, in virtualized computing environment 800 shown in FIG. 8, host computing system 702B is having an active I/O path to data store 708C. Therefore, VMDK 1 and VMDK 2 are migrated to data store 708C and VM 1 and VM 2 are migrated to host computing system 702B. Upon migration, VM 1 and VM 2 access VMDK 1 and VMDK 2 via storage network device 706B.

Figure 9:
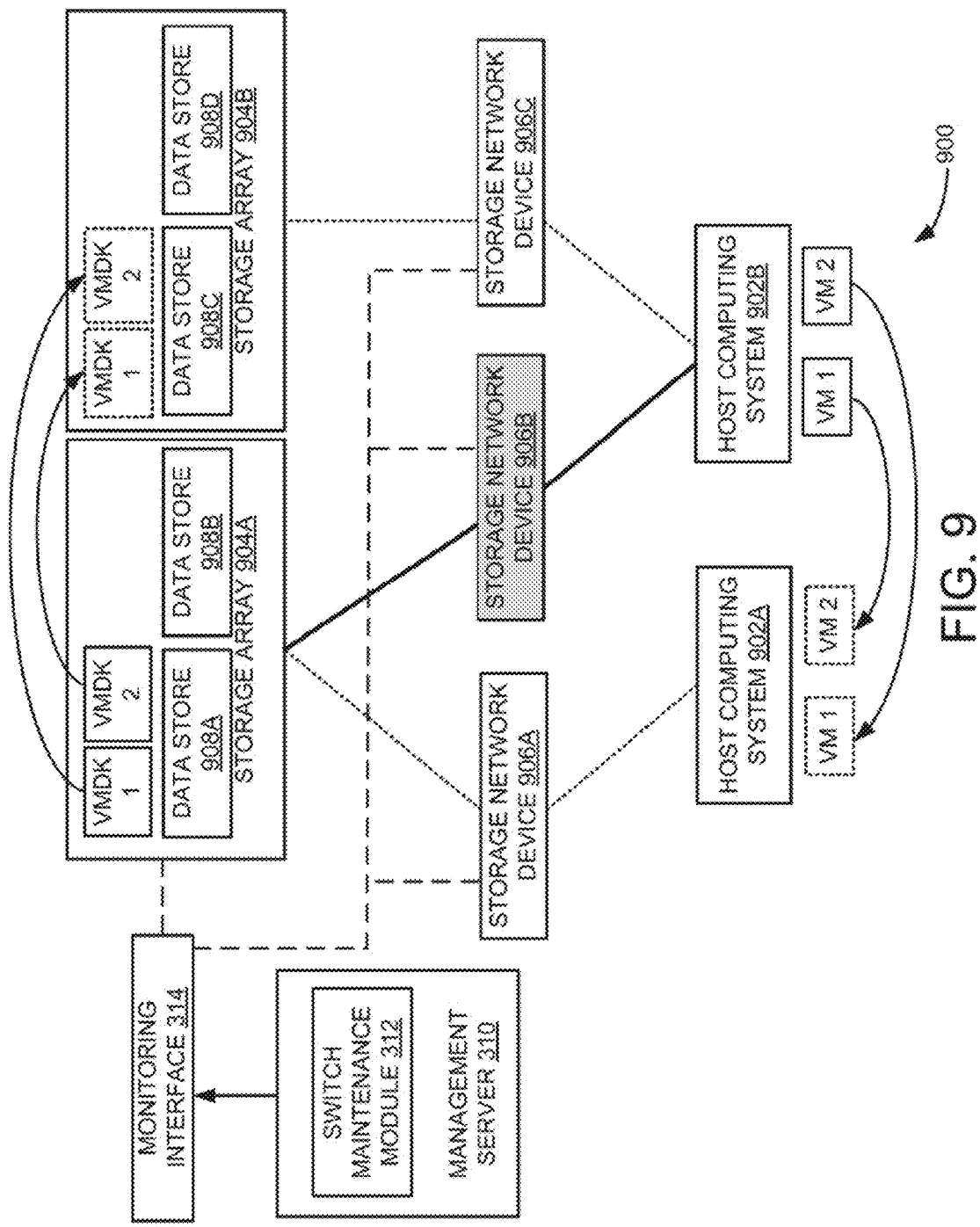
FIG. 9 illustrates placing a storage network device into a maintenance mode by recommending either migration of workloads running on the host computing system or migration of VMDKs on the data store such that the VMDKs can be accessed by the workloads via any other storage network device, according to an example embodiment.

FIG. 9 illustrates placing storage network device 906B into a maintenance mode by recommending either migration of VM 1 and VM 2 running on host computing system 902B or migration of VMDK 1 and VMDK 2 on data store 908A such that VMDK 1 and VMDK 2 can be accessed by VM 1 and VM 2 via storage network device 906A or 906C, according to an example embodiment.

In the example shown in FIG. 9, virtualized computing environment 900 includes host computing systems 902A and 902B and storage arrays 904A and 904B including respective data stores 908A-D. Furthermore, each data store 908A-D includes VMDKs to store operating system, program files, and other data associated with VMs. As shown in FIG. 9, host computing system 902A is connected to storage array 904A via storage network device 906A and host computing system 902B is connected to storage arrays 904A and 904B via storage network devices 906B and 906C, respectively.

In the example shown in FIG. 9, switch maintenance module 312 initiates a maintenance mode operation of storage network device 906B. Further, switch maintenance module 312 identifies data store 908A as having the active I/O path to host computing system 902B via storage network device 906B using the network topology map. In the example shown in FIG. 9, host computing system 902B is connected to storage network device 906C and data store 908A is connected to storage network device 906A. In this case, switch maintenance module 312 recommends migration of VMDK 1 and VMDK 2 on data store 908A to data store 908C coupled to storage network device 906C such that VMDK 1 and VMDK 2 can be accessed by VM 1 and VM 2 via storage network device 906C. Alternatively, switch maintenance module 312 also recommends migration of VM 1 and VM 2 running on host computing system 902B to host computing system 902A coupled to storage network device 906A such that VMDK 1 and VMDK 2 can be accessed by VM 1 and VM 2 via storage network device 906A. However, the priority may be given to migration of VMDK 1 and VMDK 2 since there may not be any downtime during the migration of the VMDKs.

Figure 10:
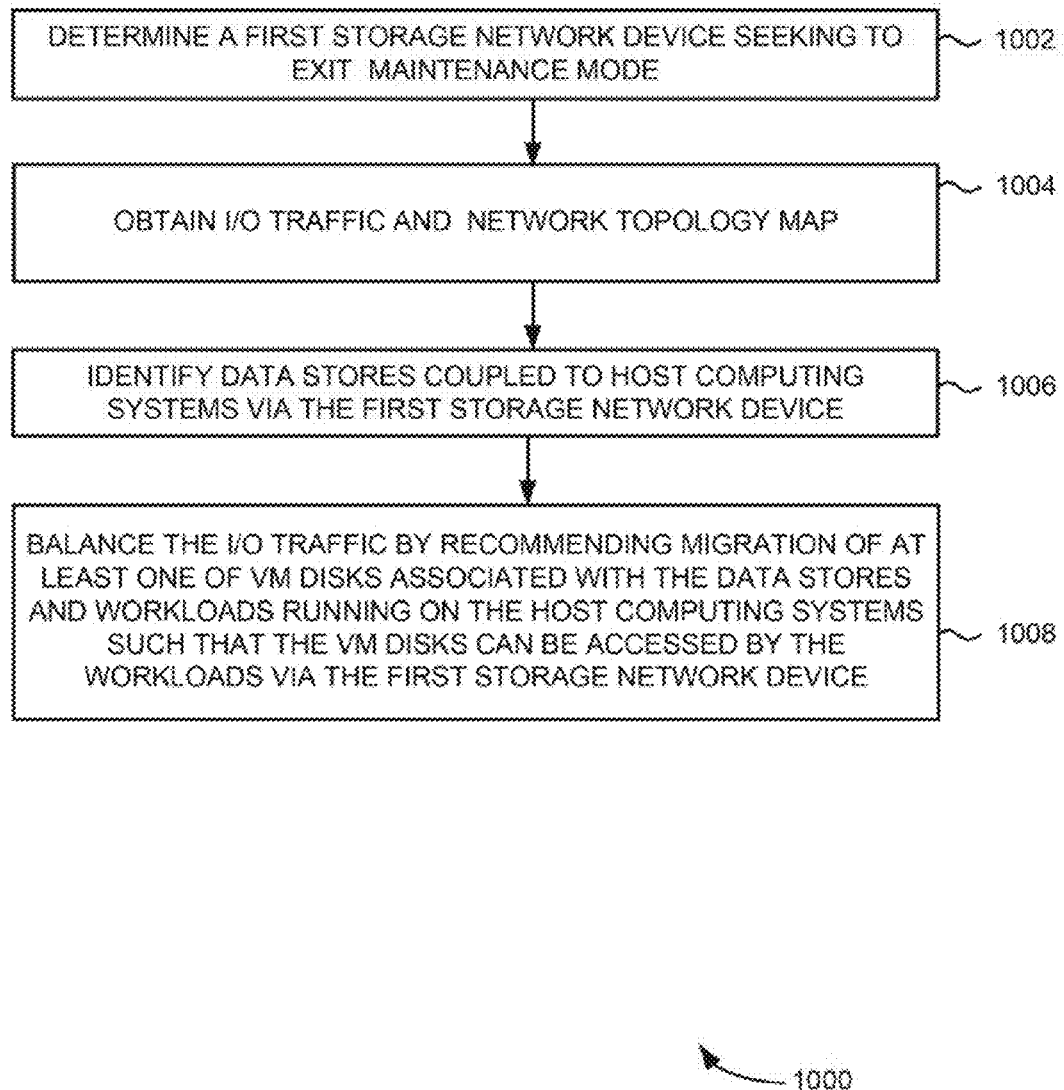
FIG. 10 is a flow chart of an example method for exiting the maintenance mode of a storage network device, according to an example embodiment.

FIG. 10 is a flow chart 1000 of an example method for exiting the maintenance mode of a storage network device, according to an example embodiment. At step 1002, a first storage network device seeking to exit maintenance mode is determined. The term "exit maintenance mode" refers to enabling the path via the storage network device and resuming of normal I/O traffic through the storage network device. For example, the storage network device may be exited from the maintenance mode upon performing replacement, hardware upgrade, service/repair, and/or software upgrade of the storage network device. At step 1004, I/O traffic and a network topology map associated with the storage network devices is obtained using a monitoring interface.

At step 1006, data stores coupled to host computing systems via the first storage network device are identified. At step 1008, the I/O traffic at the storage network devices is balanced by recommending migration of VMDKs on the identified data stores and/or workloads running on the identified host computing systems such that the VMDKs can be accessed by the workloads via the first storage network device. Alternatively, once the first storage network device is back to normal and functioning, the workloads and/or VMDKs can be migrated back such that the VMDKs can be accessed by the workloads via the first storage network device.

In various embodiments, the systems and methods described in FIGS. 1 through 9 propose at technique to place a storage network device into the maintenance mode by migrating, VMDKs and/or workloads such that the VMDKs can be accessed by the workloads via any other storage network device. Using this technique, the storage network device is placed into the maintenance mode without disconnecting any data stores or host computing systems or any other resources connected to the storage network device. Therefore, there is no downtime of the VMs running on the host computing systems except for the very brief pause incurred by a live migration of workloads (i.e., VMs).

Figure 11:
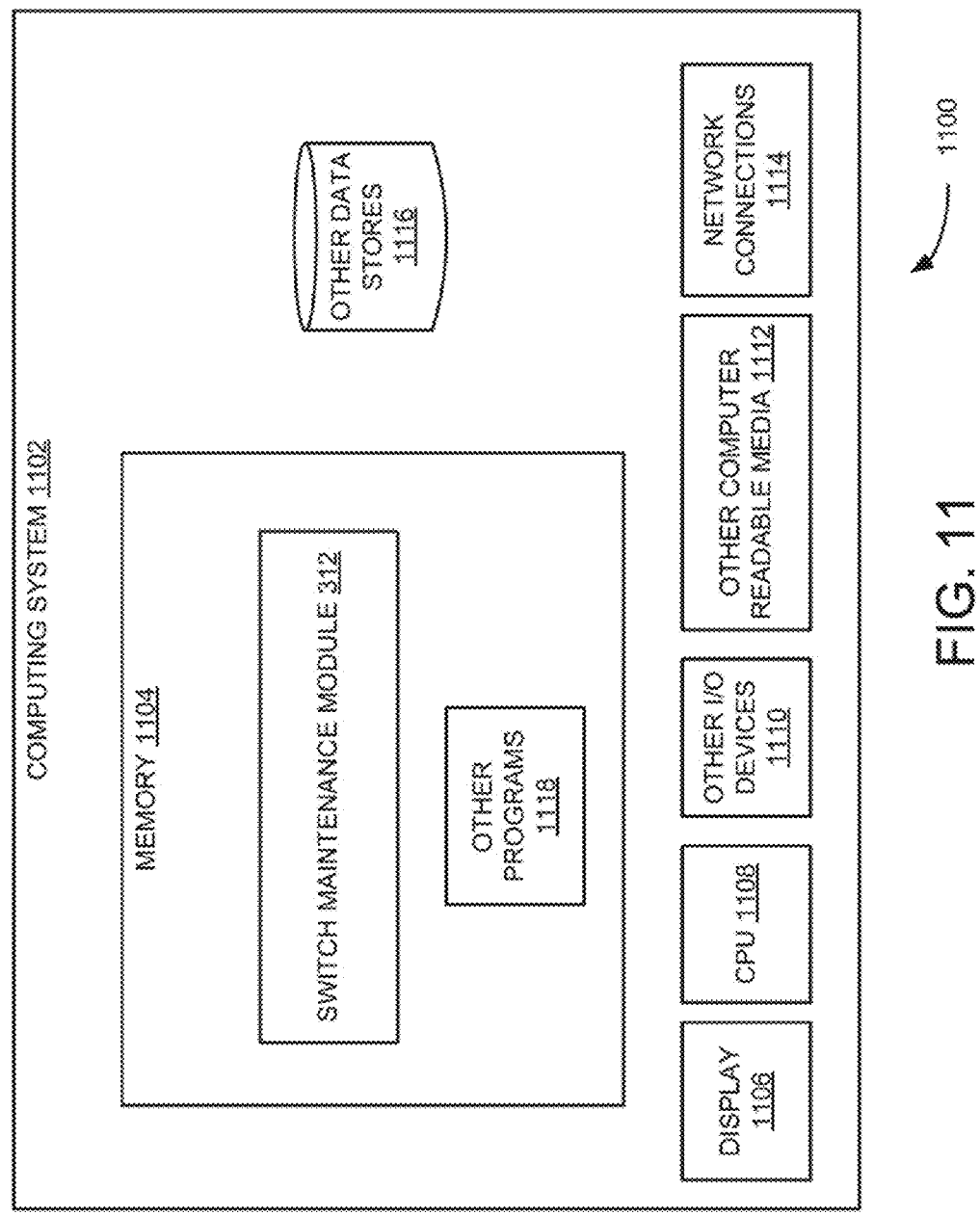
FIG. 11 is a block diagram of an example physical computing system for implementing a switch maintenance module, such as the one shown in FIGS. 3-9, according to an example embodiment.

FIG. 11 is block diagram 1100 of an example physical computing system 1102 (e.g., management server 310 shown in FIGS. 3-9 including switch maintenance module 312 according to an example embodiment. In particular, FIG. 11 shows computing system 1102 that may be utilized to implement switch maintenance module 312. Note that one or more general purpose virtual or physical computer systems suitably instructed may be used to implement switch maintenance module 312. In addition, computing system 1102 may comprise one or more distinct computing systems/devices and may span distributed locations.

In the embodiment shown, computing system 1102 may comprise computer memory ("memory") 1104, display 1106, one or more Central Processing Units ("CPU") 1108, input/output devices 1110 (e.g., keyboard, mouse, etc.), other computer-readable media 1112, and network connections 1114. Switch maintenance module 312 is shown residing in memory 1104. The components of switch maintenance module 312 may execute on one or more CPUs 1108 and implement techniques described herein. Other code or programs 1118 an administrative interface, a Web server, and the like) may also reside in memory 1104, and execute on one or more CPUs 1108. Further, other data repositories, such as data store 1116, may also reside in computing system 1102. One or more of the components in FIG. 11 may not be present in any specific implementation. For example, some embodiments may not provide other computer readable media 1112 or display 1106.

Switch maintenance module 312 interacts via network with host computing, systems in the cluster. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of switch maintenance module 312, such as in data store 1116, can be available by standard mechanisms such as through C, C++, C#, and Java APIs; libraries for accessing files, databases, or other data repositories; through scripting languages such as XML; or through Web servers, FTP servers, or other types of servers providing access to stored data. Furthermore, in some embodiments, some or all of the components of switch maintenance module 312 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The invention claimed is:

1. An automated method of placing a first storage network device into a maintenance mode in a virtualized computing environment in which each data store is connected to at least one host computing system via a storage network device, comprising:
    identifying a first data store having an active input/output (I/O) path to a first host computing system via the first storage network device; and
    migrating at least one of virtual machine disks (VMDKs) on the first data store and workloads running on the first host computing system such that the VMDKs can be accessed by the workloads via any other storage network device.

2. The method of claim 1, further comprising:
    determining whether there is any other active I/O path via the first storage network device;
    if so, repeating the steps of identifying, migrating, and determining for a next active I/O path via the first storage network device; and
    if not, placing the first storage network device into the maintenance mode.

3. The method of claim 1, wherein migrating at least one of the VMDKs on the first data store and the workloads running on the first host computing system, comprises:
    determining whether at least one of the first data store and the first host computing system is connected to any other storage network device; and
    if the first host computing system is not coupled to any other storage network device and the first data store is coupled to a second storage network device, migrating the workloads running on the first host computing system to at least one other host computing system coupled to the second storage network device such that the VMDKs can be accessed by the workloads via the second storage network device.

4. The method of claim 3, further comprising:
    if the first data store is not coupled to any other storage network device and the first host computing system is coupled to a third storage network device, migrating the VMDKs on the first data store to at least one other data store coupled to the third storage network device such that the VMDKs can be accessed by the workloads via the third storage network device.

5. The method of claim 3, further comprising:
    if the first host computing system and the first data store are not coupled to any other storage network device, migrating the workloads running on the first host computing system to at least one other host computing system and the VMDKs on the first data store to at least one other data store such that the VMDKs can be accessed by the workloads via any other storage network device.

6. The method of claim 3, further comprising:
if the first host computing system is coupled to a fourth storage network device and the first data store is coupled to a fifth storage network device, performing one of:
  migration of the VMDKs on the first data store to at least one other data store coupled to the fourth storage network device such that the VMDKs can be accessed by the workloads via the fourth storage network device; and
  migration of the workloads running on the first host computing system to at least one other host computing system coupled to the fifth storage network device such that the VMDKs can be accessed by the workloads via the fifth storage network device.

7. The method of claim 1, further comprising exiting the maintenance mode of the first storage network device, comprising:
  identifying data stores coupled to host computing systems via the first storage network device; and
  balancing the I/O traffic by migrating at least one of VMDKs on the data stores and workloads running on the host computing systems such that the VMDKs can be accessed by the workloads via the first storage network device.

8. The method of claim 1, wherein the storage network device comprises a switch selected from the group consisting of a fibre channel (FC) switch, Ethernet switch, and FC over Ethernet (FCoE) switch.

9. The method of claim 1, wherein the first storage network device is placed into the maintenance mode for at least one of replacement, hardware upgrade, and software upgrade of the first storage network device.

10. A system comprising:
  a plurality of storage network devices;
  a plurality of host computing systems;
  a plurality of data stores, wherein each data store is coupled to at least one of the host computing systems via one of the plurality of storage network devices; and
  a management server comprising a switch maintenance module to automatically place a first storage network device into a maintenance mode in a virtualized computing environment, by:
    identifying a first data store having an active input/output (I/O) path to a first host computing system via the first storage network device; and
    migrating at least one of virtual machine disks (VMDKs) on the first data store and workloads running on the first host computing system such that the VMDKs can be accessed by the workloads via any other storage network device.

11. The system of claim 10, wherein the switch maintenance module is further configured to:
  determine whether there is any other active I/O path via the first storage network device;
  if so, repeat the steps of identifying, migrating, and determining for a next active I/O path via the first storage network device; and
  if not, place the first storage network device into the maintenance mode.

12. The system of claim 10, wherein the switch maintenance module is further configured to:
  determine whether at least one of the first data store and the first host computing system is connected to any other storage network device;
  if the first host computing system is not coupled to any other storage network device and the first data store is coupled to a second storage network device, migrate the workloads running on the first host computing system to at least one other host computing system coupled to the second storage network device such that the VMDKs can be accessed by the workloads via the second storage network device.

13. The system of claim 12, wherein the switch maintenance module is further configured to:
  if the first data store is not coupled to any other storage network device and the first host computing system is coupled to a third storage network device, migrate the VMDKs on the first data store to at least one other data store coupled to the third storage network device such that the VMDKs can be accessed by the workloads via the third storage network device.

14. The system of claim 12, wherein the switch maintenance module is further configured to:
  if the first host computing system and the first data store are not coupled to any other storage network device, migrate of the workloads running on the first host computing system to at least one other host computing system and the VMDKs on the first data store to at least one other data store such that the VMDKs can be accessed by the workloads via any other storage network device.

15. The system of claim 12, wherein the switch maintenance module is further configured to:
  if the first host computing system is coupled to a fourth storage network device and the first data store is coupled to a fifth storage network device, perform one of:
    migration of the VMDKs on the first data store to at least one other data store coupled to the fourth storage network device such that the VMDKs can be accessed by the workloads via the fourth storage network device; and
    migration of the workloads running on the first host computing system to at least one other host computing system coupled to the fifth storage network device such that the VMDKs can be accessed by the workloads via the fifth storage network device.

16. The system of claim 10, wherein the switch maintenance module exits the maintenance mode of the first storage network device, by:
  identifying data stores coupled to host computing systems via the first storage network device; and
  balancing the I/O traffic by migrating at least one of VMDKs on the data stores and workloads running on the host computing systems such that the VMDKs can be accessed by the workloads via the first storage network device.

17. A non-transitory computer-readable storage medium including instructions that are configured, when executed by a computing system, to perform a method of placing a first storage network device into a maintenance mode in a virtualized computing environment in which each data store is connected to at least one host computing system via a storage network device, the method comprising:
  identifying a first data store having an active input/output (I/O) path to a first host computing system via the first storage network device; and
  migrating at least one of virtual machine disks (VMDKs) on the first data store and workloads running on the first host computing system such that the VMDKs can be accessed by the workloads via any other storage network device.

18. The non-transitory computer-readable storage medium of claim 17, further comprising:
   determining whether there is any other active I/O path via the first storage network device;
   if so, repeating the steps of identifying, migrating, and determining for a next active I/O path via the first storage network device; and
   if not, placing the first storage network device into the maintenance mode.

19. The non-transitory computer-readable storage medium of claim 17, wherein migrating at least one of VMDKs on the first data store and workloads running on the first host computing system, comprises:
   determining whether at least one of the first data store and the first host computing system is connected to any other storage network device; and
   if the first host computing system is not coupled to any other storage network device and the first data store is coupled to a second storage network device, migrating the workloads running on the first host computing system to at least one other host computing system coupled to the second storage network device such that the VMDKs can be accessed by the workloads via the second storage network device.

20. The non-transitory computer-readable storage medium of claim 19, further comprising:
   if the first data store is not coupled to any other storage network device and the first host computing system is coupled to a third storage network device, migrating the VMDKs on the first data store to at least one other data store coupled to the third storage network device such that the VMDKs can be accessed by the workloads via the third storage network device.

21. The non-transitory computer-readable storage medium of claim 19, further comprising:
   if the first host computing system and the first data store are not coupled to any other storage network device, migrating the workloads running on the first host computing system to at least one other host computing system and the VMDKs on the first data store to at least one other data store such that the VMDKs can be accessed by the workloads via any other storage network device.

22. The non-transitory computer-readable storage medium of claim 19, further comprising:
   if the first host computing system is coupled to a fourth storage network device and the first data store is coupled to a fifth storage network device, performing one of:
      migration of the VMDKs on the first data store to at least one other data store coupled to the fourth storage network device such that the VMDKs can be accessed by the workloads via the fourth storage network device; and
      migration of the workloads running on the first host computing system to at least one other host computing system coupled to the fifth storage network device such that the VMDKs can be accessed by the workloads via the fifth storage network device.

23. The non-transitory computer-readable storage medium of claim 17, further comprising exiting the maintenance mode of the first storage network device, comprising:
   identifying data stores coupled to host computing systems via the first storage network device; and
   balancing the I/O traffic by migrating at least one of VMDKs on the data stores and workloads running on the host computing systems such that the VMDKs can be accessed by the workloads via the first storage network device.

* * * * *